United States Patent Office 2,904,564
Patented Sept. 15, 1959

2,904,564

1,2,4-TRIBROMO PREGNANE-17α,21 DIOL-3,11,20 TRIONE-21-ACETATE

Edward W. Tristram, Cranford, N.J., assignor to Merck & Co., Inc., Rahway, N.J., a corporation of New Jersey No Drawing. Application August 5, 1955
Serial No. 526,773

4 Claims. (Cl. 260—397.45)

This invention relates to the preparation of 1,4-pregnadiene-17α,21-diol-3,11,20-trione. It is also concerned with the preparation of the novel chemical compounds 1,2,4 - tribromopregnane - 17α,21-diol-3,11,20-trione-21-acetate and 4-bromo-1-pregnene-17α,21-diol-3,11,20-trione-21-acetate produced as intermediates in the synthesis of 1,4-pregnadiene-17α,21-diol-3,11,20-trione. The invention also relates to 2-bromo-1,4-pregnadiene-17α,21-diol-3,11,20-trione-21-acetate.

The 1,4 - pregnadiene-17α,21-diol-3,11,20-trione with which this invention is concerned possesses marked and effective properties in the treatment of arthritic conditions. One of the chief disadvantages encountered in the clinical use of hydrocortisone and cortisone has been the retention of sodium and water in the body. In contrast with this, the retention of sodium and water in the body is markedly reduced when 1,4-pregnadiene-17α,21-diol-3,11,20-trione is administered.

In preparing 1,4-pregnadiene-17α, 21-diol-3,11,20-trione in accordance with the present invention, the starting material 1-pregnene-17α,21-diol-3,11,20-trione-21-acetate which has the structure—

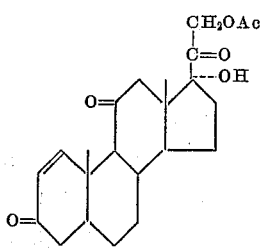

is reacted with two molar equivalents of bromine to form 1,2,4 - tribromopregnane-17α,21-diol-3,11,20-trione-21-acetate having the structure—

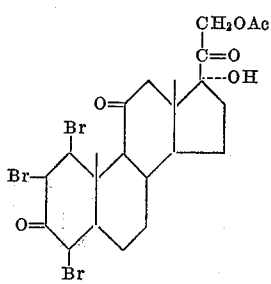

The latter compound is reacted with sodium iodide to form 4-bromo-1-pregnene-17α,21-diol-3,11,20-trione-21-acetate having the structure—

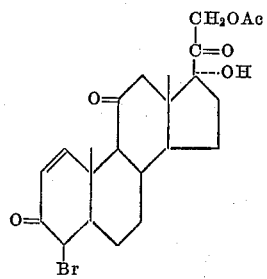

The latter compound is reacted with an organic base in the presence of lithium chloride to form 1,4-pregnadiene-17α,21-diol-3,11,20-trione-21-acetate having the following structure—

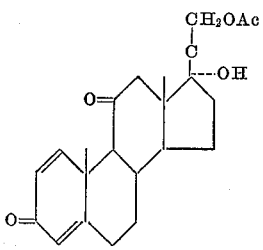

The organic bases which may be employed in this reaction include dimethylformamide, collidine and dimethylaniline.

The 1,4-pregnadiene-17α,21-diol-3,11,20-trione-21-acetate may be hydrolyzed to form 1,4-pregnadiene-17α,21-diol-3,11,20-trione.

Alternatively the 1,2,4-tribromopregnane-17α,21-diol-3,11,20-trione-21-acetate can be reacted with an organic base in the presence of lithium chloride to form 2-bromo-1,4-pregnadiene-17α,21-diol-3,11,20-trione-21-acetate having the structure—

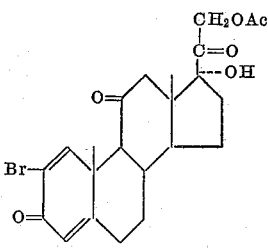

In accordance with one method of carrying out this invention 1 - pregnene-17α,21-diol-3,11,20-trione-21-acetate is dissolved in acetic acid and reacted with two molar equivalents of bromine to form 1,2,4-tribromopregnane-17α,21-diol-3,11,20-trione-21-acetate. The reaction mixture thus obtained can be treated with sodium iodide to form 4 - bromo-1-pregnene-17α,21-diol-3,11,20-trione-21-acetate.

Alternatively, if desired, the 1,2,4-tribromopregnene-17α,21-diol-3,11,20-trione-21-acetate can be recovered from the reaction mixture by adding water to the reaction mixture whereupon the 1,2,4-tribromopregnene-17α,21-diol-3,11,20-trione-21-acetate precipitates from solution.

The 4-bromo-1-pregnene-17α,21-diol-3,11,20-trione-21-acetate is reacted with lithium chloride and dimethylformamide to form 1,4-pregnadiene-17α,21-diol-3,11,20-trione-21-acetate. The latter compound is hydrolyzed to form 1,4-pregnadiene-17α,21-diol-3,11,20-trione.

In accordance with another procedure 1,2,4-tribromopregnene-17α,21-diol-3,11,20-trione-21-acetate is treated with lithium chloride and dimethylformamide. The hot reaction mixture is diluted with water and allowed to cool to room temperature whereupon 2-bromo-1,4-pregnadiene-17α,21-diol-3,11,20-trione-21-acetate precipitates from the reaction mixture.

The following examples are given for the purpose of illustration:

Example 1

The preparation of 1,4-pregnadiene-17α,21-diol-3,11,20-trione can be indicated graphically as follows:

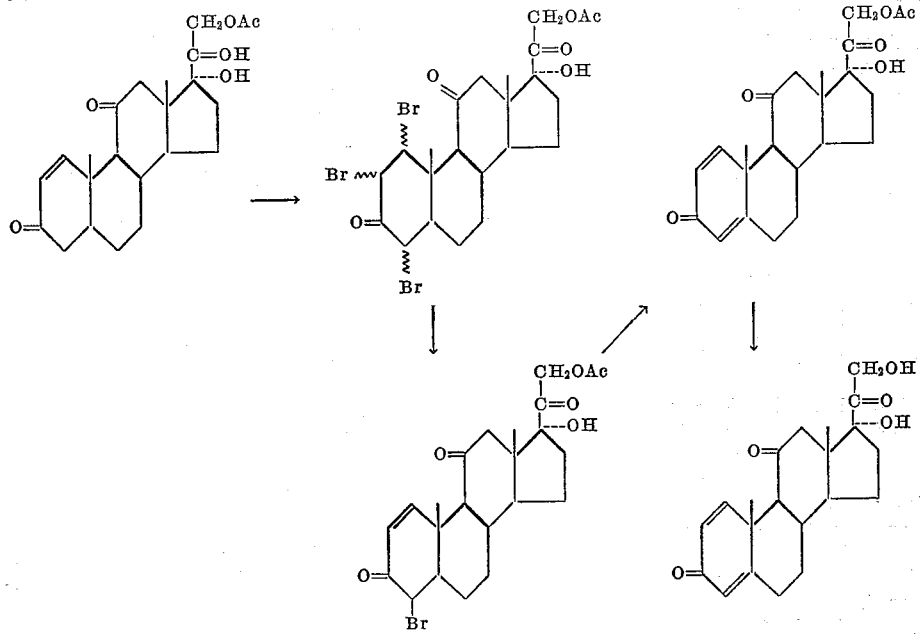

To a solution of 5.0 grams (12.5 millimoles) of 1-pregnene-17α,21-diol-3,11,20-trione-21-acetate in 250 ml. of glacial acetic acid at room temperature was added with stirring over the course of five minutes 4.0 grams (25 millimoles) of bromine in 17 ml. of acetic acid. The 1,2,4 - tribromopregnane - 17α,21 - diol - 3,11,20 - trione-21-acetate thus formed can be isolated as described in Example 2. In the present procedure, however, the 1,2,4-tribromopregnane-17α,21-diol-3,11,20-trione-21-acetate is not isolated from solution. After stirring for ten minutes, to the clear yellow solution containing 1,2,4-tribromopregnane - 17α,21 - diol - 3,11,20 - trione - 21 - acetate was added 3.75 grams (25 millimoles) sodium iodide dissolved in 50 ml. of acetic acid for five minutes. The solution was diluted with 250 ml. of water and 0.1 M sodium thiosulfate solution was added dropwise with stirring until the iodine color was discharged. A total of 225 ml. (90% of theory) of thio sulfate solution was required. An additional 500 ml. of water was added dropwise with stirring and the slurry was then cooled in the ice bath for one hour. The product 4-bromo-1-pregnene-17α,21-diol-3,11,20-trione - 21 - acetate was filtered, washed with water and dried under vacuum.

Light yellow crystals of 4-bromo-1-pregnene-17α,21-diol-3,11,20-trione-21-acetate were obtained. These crystals had a λ maximum 2220 A., E% 143 in methanol. Analysis.—Calculated for $C_{23}H_{29}O_6$ Br: Br, 16.6. Found: Br, 17.1. A sample recrystallized from methanol contained 16.8% bromine, $[\alpha]_D +163°$ in chloroform. λ maximum 220, E% 160.

Two grams (4.1 millimoles) of 4-bromo-1-pregnene-17α,21-diol-3,11,20-trione-21-acetate was added to 0.5 gram of lithium chloride in 20 ml. of dimethylformamide and the reaction mixture heated on a steam bath for two hours. The clear solution was diluted with 20 ml. of water while hot and allowed to cool to room temperature over a two-hour period. A crystalline product separated from solution and was recovered by filtration. The crystals were washed with 10 ml. of 50–50 water-dimethylformamide and then with water. After drying under vacuum the crude crystals of 1,4-pregnadiene-17α,21-diol-3,11,20-trione-21-acetate had a melting point of 220–230° C. λ maximum 2640, E% 366 in sulfuric acid, λ maximum 2390, E% 356 in methanol.

1,4 - pregnadiene - 17α,21 - diol - 3,11,20 - trione-21-acetate can be readily converted to 1,4-pregnadiene-17α,21-diol-3,11,20-trione by hydrolysis of the 1,4-pregnadiene-17α,21-diol-3,11,20-trione-21-acetate in an oxygen-free atmosphere with sodium methoxide in methanol for a period of about seven minutes at room temperature.

Example 2

Preparation of 2-bromo-1,4-pregnadiene-17α,21-diol-3,11,20-trione-21-acetate can be graphically indicated as follows:

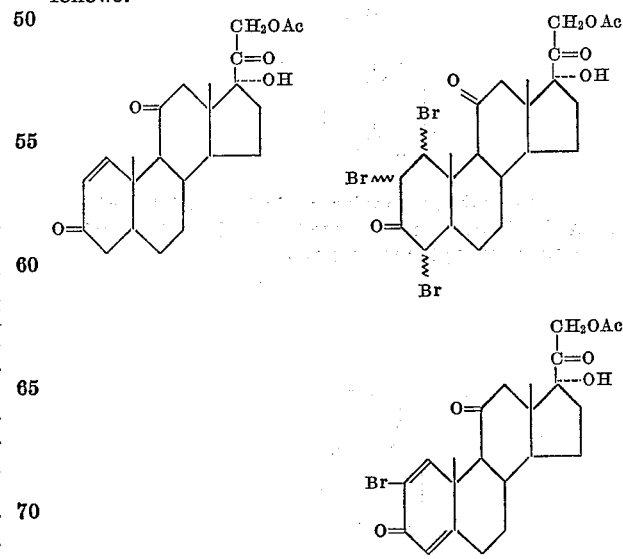

One gram (2.5 millimoles) of 1-pregnene-17α,21-diol-3,11,20-trione-21-acetate in 50 ml. of glacial acetic acid was treated with 0.8 gram (5.0 millimoles) of bromine over the course of five minutes. After stirring at room temperature for twenty minutes the reaction was quenched with 200 ml. water. After standing for one hour the product was filtered, washed with much water and dried under vacuum. A methanol solution had no absorption maximum in the ultraviolet.

A solution of 1.24 grams (1.9 millimoles) of 1,2,4-tribromopregnane - 17α,21 - diol - 3,11,20 - trione - 21-acetate and 1.2 grams of lithium chloride in 12.5 ml. of dimethylformamide was heated on the steam bath for two hours. The hot solution was diluted with an equal volume of water and allowed to cool to room temperature. The solid was filtered off, washed with water, and dried under vacuum to give crude 2-bromo-1,4-pregnadiene-17α,21-diol-3,11,20-trione-21-acetate, λ maximum 2480 A, E% 260 in methanol.

Any departure from the above description which conforms to the present invention is intended to be included within the scope of the claims.

What is claimed is:

1. 1,2,4 - trigromopregnane - 17α,21 - diol - 3,11,20-trione-21-acetate.

2. The process which comprises reacting 1-pregnene-17α,21-diol-3,11,20 - trione - 21 - acetate with two molar equivalents of bromine to form 1,2,4-tribromopregnane-17α,21-diol-3,11,20-trione-21-acetate, and reacting the latter compound with sodium iodide to form 4-bromo-1-pregnene-17α,21-diol-3,11,20-trione-21-acetate.

3. The process which comprises reacting 1-pregnene-17α,21-diol-3,11,20-trione - 21 - acetate with two molar equivalents of bromine to form 1,2,4-tribromopregnane-17α,21-diol-3,11,20-trione-21-acetate.

4. The process which comprises reacting 1,2,4-tribromopregnane - 17α,21 - diol - 3,11,20 - trione - 21 - acetate with sodium iodide to form 4-bromo-1-pregnene-17α,21-diol-3,11,20-trione-21-acetate.

References Cited in the file of this patent

UNITED STATES PATENTS

| | | |
|---|---|---|
| 2,590,978 | Kendall | Apr. 1, 1952 |
| 2,703,805 | Rosenkranz | Mar. 8, 1955 |
| 2,730,537 | Nathan | Jan. 10, 1956 |
| 2,735,855 | Djerassi | Feb. 21, 1956 |
| 2,737,518 | Herzog | Mar. 6, 1956 |